United States Patent [19]

Hirao et al.

[11] 4,388,133

[45] Jun. 14, 1983

[54] METHOD OF MANUFACTURING ARTIFICIAL WOOD VENEER

[75] Inventors: Shozo Hirao, Shuita; Yasuhiro Saihara, Kadoma; Toshio Nakanishi, Okazaki; Ichiro Ihara, Okazaki; Yoshio Sano, Okazaki, all of Japan

[73] Assignee: Matsushita Electric Works, Ltd., Osaka, Japan

[21] Appl. No.: 326,618

[22] Filed: Dec. 2, 1981

[51] Int. Cl.³ .............................................. B29C 19/00

[52] U.S. Cl. .................................... 156/245; 156/242; 156/254; 156/264; 428/106; 428/151

[58] Field of Search ............... 156/230, 241, 242, 245, 156/254, 289, 264; 428/106, 151

[56] References Cited

U.S. PATENT DOCUMENTS 3,312,582 4/1967 Allan et al. ......................... 428/106

3,418,195 12/1968 Allan .................................. 428/106

3,977,933 8/1976 Sadashige ........................... 156/264

FOREIGN PATENT DOCUMENTS 1391077 4/1975 United Kingdom .

*Primary Examiner*—Edward C. Kimlin

*Assistant Examiner*—Timothy W. Heitbrink

*Attorney, Agent, or Firm*—Burns, Doane, Swecker & Mathis

[57] ABSTRACT

A method of manufacturing artificial wood veneers comprises a step in which an artificial flitch formed of laminated material veneers respectively cut out of a certain kind of inexpensive natural wood is sliced in the direction of obtaining straight grain pattern to obtain a collected veneer in which mutual joining surfaces of the material veneers extend in parallel with each other and in the thickness direction, and a step in which many of the collected veneers thus obtained and material veneers cut out of another kind of natural wood are laminated, pressed and collected to form another artificial flitch which is sliced in a direction of obtaining a flat or flowered grain pattern which is very similar to that of a high grade natural wood.

35 Claims, 19 Drawing Figures

METHOD OF MANUFACTURING ARTIFICIAL WOOD VENEER

This invention relates generally to methods of manufacturing artificial wood veneers and, more particularly, to improvements in the method of manufacturing artificial veneers resembling natural veneers of such high grade wood as, for example, a zelkova serrata or the like from inexpensive natural woods.

In the case when such natural wood called annular pore wood among various natural woods as, for example, a zelkova serrata or the like is sliced in the flat or quarter grain direction to cut out plate materials, a grain pattern is received in which annual ring borders will clearly appear in the shape of flames or as if flowered (which shall be referred to hereinafter as "flowered grain direction" and "flowered grain pattern"). Such plate materials will be adapted as wall covering materials for room interior decorations. However, the resource of such natural wood as the zelkova serrata is not sufficient and such wood is so expensive as to be unable to be easily acquired.

It has been well known, on the other hand, as a basic method to obtain an artificial wood veneer by cutting an inexpensive natural wood into veneers (which shall be referred to hereinafter as "material veneer") by means of such veneer manufacturing machine as a rotary lathe. It is possible to laminate many of thus obtained material veneers to form a batch called artificial flitch and slicing this flitch in the flowered grain direction to obtain an artificial veneer. There has been suggested, for example, in British Pat. No. 1,391,077 a formation wherein a plurality of the laminated material veneers, with a binder or glue applied between them, are inserted between a pair of pressing dies having pressing surfaces curved to be mutually complemental and are pressed by such pressing dies to be collected into a curved artificial flitch and this artificial flitch is sliced in the flowered grain direction to obtain an artificial veneer.

According to the method of this British patent, however, simply many of such material veneers are laminated and a plurality of annual rings can be shown but is has been substantially difficult to simulate the grain pattern of such natural wood having an annual ring border in which many vessels concentrate near a growth ring and including a thick brown pore range as in such annular pore wood as zelkova serrata and the like wood.

Further, Japanese Patent Publication No. 21521/1975 discloses that many concave grooves parallel with each other are formed in the material veneer. A plurality of such material veneers are laminated with a binder applied between them and are pressed to be collected to form an artificial flitch in the same manner as in the foregoing British patent so that, on the artificial veneer sliced in the flowered grain direction, simulated vessels will appear due to the concave grooves and a grain pattern resembling the annual ring border including the pore range will be provided.

While, in the method of this Japanese patent publication, rows of simulated vessels can be presented by the concave grooves formed in the respective material veneers, it is still insufficient to simulate the natural wood grain pattern having particularly such annual ring borders including many vessels concentrated near the growth ring as well as the pore ranges as in the annular pore wood of zelkova serrata or the like. Further, the method is defective in that, if the concave grooves formed in the respective material veneers are made too deep, they will cause the veneer to be cracked when the material veneer lamination is pressed between the curved surfaces of the dies, and that, on the other hand, if the concave grooves are made shallow, the representation of the vessels will become further insufficient.

A primary object of the present invention is, therefore, to provide a method of manufacturing from inexpensive woods an artificial veneer having a grain pattern very similar to that obtained by slicing in the flowered grain direction a high grade wood relatively few in the resource and uneasy to get.

Another object of the present invention is to provide a method of manufacturing artificial veneers wherein the artificial flitches are formed in two steps, whereby the veneers are provided with a grain pattern resembling natural flowered grain pattern obtained by slicing in the flowered grain direction such annular pore wood as, for example, a zelkova serrata or the like.

A further object of the present invention is to provide a method of manufacturing artificial veneers well simulated in the grain pattern to that of a natural wood having annual ring borders including many vessels concentrated near each growth ring and pore ranges presenting thick brown color.

Yet another object of the present invention is to provide a method of manufacturing artificial veneers which can faithfully represent tone differences present in the grain pattern of a natural wood.

A still further object of the present invention is to provide a method of manufacturing artificial veneers which are easy to manufacture so as to remarkably improve the workability and to lower manufacturing costs.

Referring here to the term "artificial flitch" used in this specification means a lamination of many veneers of same or different kinds of the material veneers, as well as later defined collected veneers, composite veneers and composite collected veneers as laminated and pressed with a binder applied between them to be collected into a batch.

The "material veneer" before defined is a veneer as cut out of a material by such veneer manufacturing machine as a rotary lathe and cut to be of a predetermined width. The term "collected veneer" means a veneer obtained by forming an artificial flitch of material veneers and slicing this artificial flitch in the straight grain direction. The term "composite veneer" means a veneer obtained by assembling and joining the collected veneers and material veneers. The term "composite collected veneer" means a veneer obtained by assembling and joining two or more collected veneers.

On the other hand, the term "straight grain direction" herein used means a direction in which many joining lines of veneers with each other appear in parallel. The term "flowered grain direction" means a direction in which joining lines of respective veneers with each other appear as flowered or like flames.

Further technical idea as well as other objects and advantages of the present invention shall become apparent from the following desclosure detailed with reference to certain preferred embodiments shown in accompanying drawings, in which.

The present invention shall now be explained with reference to several embodiments shown in the accompanying drawings. It should be appreciated that the present invention is not to be limited only to these embodiments but is to include all other modifications, alterations and equivalent arrangements possible within the scope of appended claims.

Figure 1A:
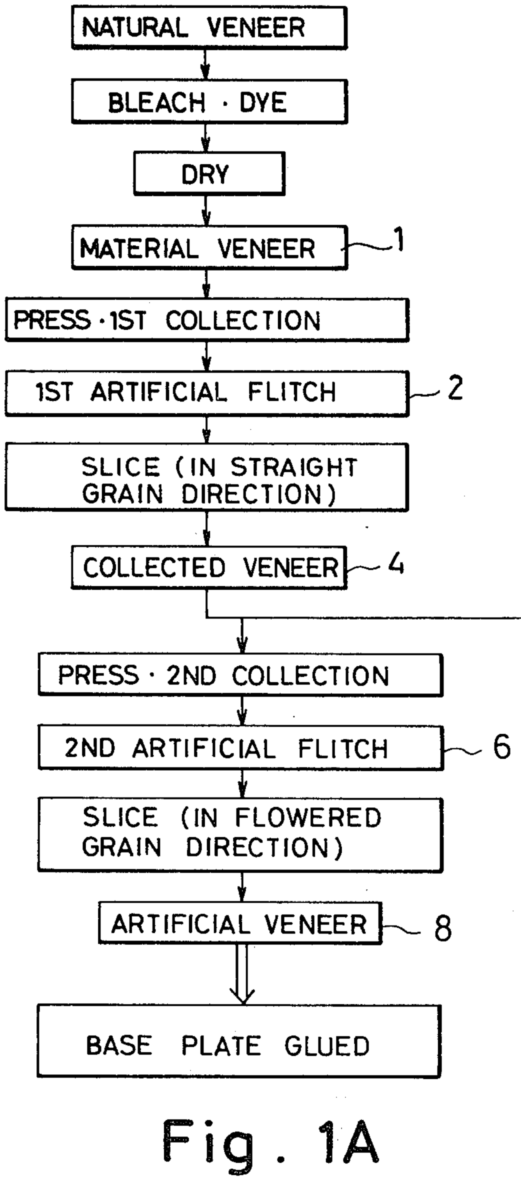
FIG. 1A is a block diagram showing steps of the method of manufacturing artificial veneers according to the present invention.
Figure 1B:
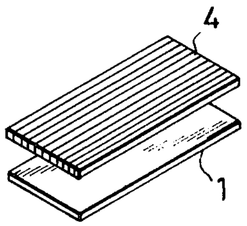
FIG. 1B is a perspective view as disassembled of an essential part of a second flitch made at the time of the second collection in the method of manufacturing artificial veneers in FIG. 1A.
Figure 2:
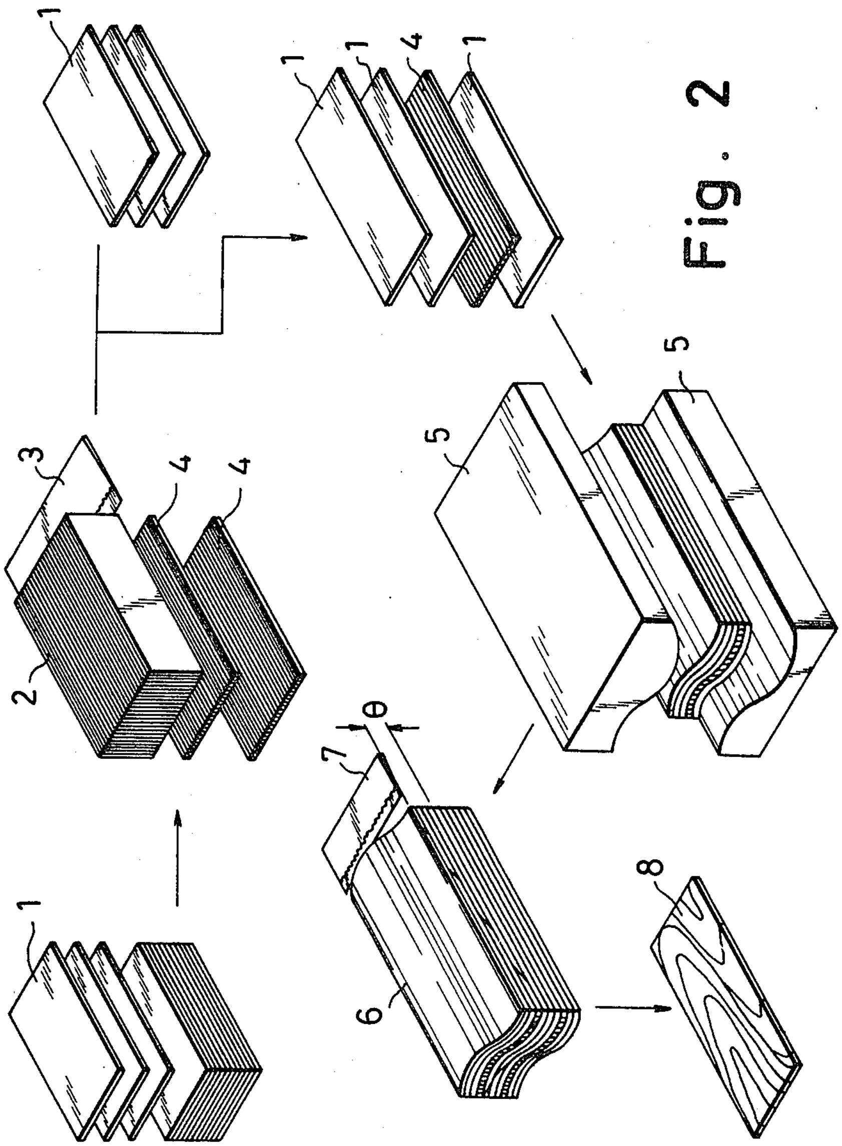
FIG. 2 is a more detailed explanatory view of the steps of main parts in FIG. 1A, the artificial veneer manufacturing steps proceeding in the order indicated by arrows.

According to one feature of the present invention, an artificial veneer having a pattern very similar to that presented by the pore ranges at annual ring borders in natural woods can be realized by a collected veneer obtained by forming two artificial flitches at different steps and slicing the first flitch in the straight grain direction. Referring more specifically thereto with reference to FIGS. 1A, 1B and 2, material plates cut out of a natural wood by such veneer manufacturing machine as a rotary lathe in a well known manner are bleached as required, dyed in a proper tone and dried to obtain material veneers 1. Then, a plurality of material veneers 1 made relatively thick in the tone are painted with a binder on the flat surfaces and laminated, this lamination is inserted between a pair of ordinary pressing dies having flat pressing surfaces and well pressed to be collected (first collection), thereby a first artificial flitch 2 is formed, which is sliced with a cutter 3 in the straight grain direction, that is, in the direction in which many joining lines of the veneers with each other appear in parallel, and collected veneers 4 are obtained. Then, as shown in FIG. 1B, the collected veneers 4 and other material veneers made relatively thin in the tone are combined at a ratio preferably of one collected veneer 4 to 1 to 6 material veneers 1 and many of such combinations are heaped up into a batch of laminations, and the batch is inserted between a pair of pressing dies 5 having curved pressing surfaces and well pressed to be collected (second collection), thereby a second artificial flitch 6 curved or wavy (in a direction transversing the longitudinal direction of the respective veneers in the present instance) is formed. Then, an artificial veneer 8 as a final molding is finished by slicing this second artificial flitch 6 with a cutter 7 in the flowered grain direction, that is, in the direction at an angle $\theta$ with the plane including the collected veneer 4 (FIG. 2).

Figure 3:
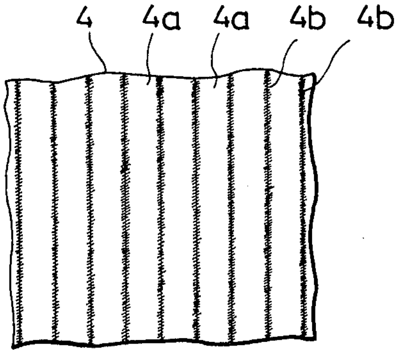
FIG. 3 is a fragmentary view as magnified of the collected veneer in the method of FIG. 1A as shown schematically.

In this case, a dye or pigment of a proper concentration is mixed in the binder used at the time of forming the first and second flitches. In the collected veneer 4 obtained by slicing the first flitch 2 in the straight grain direction, therefore, as shown in FIG. 3 as somewhat exaggerated, the binder permeates into the respective adjacent material veneers 1 forming the collected veneer 4, so that a combination of material veneer parts **4*a* and binder parts 4*b* in the collected veneer 4 will appear as a whole in a thicker tone than adjacent parts in which the material veneers 1 are positioned and the final artificial veneer 8** will have a pattern of annual ring borders well presenting the pore ranges.

Figure 4:
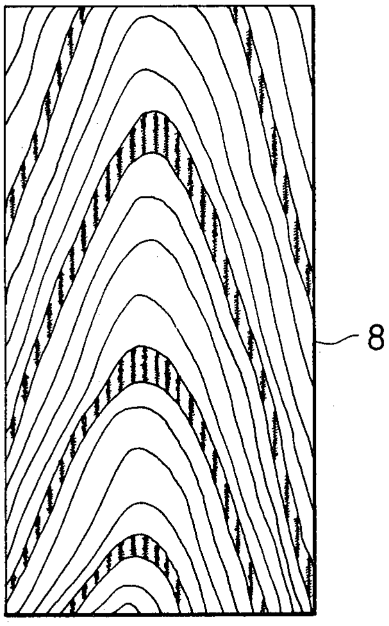
FIG. 4 is a view for schematically showing a part of the surface of the artificial veneer obtained finally as sliced in the flowered grain direction by the method of FIG. 1A.

In other words, in the artificial veneer 8 finally obtained by slicing the second flitch 6 in the flowered grain direction, as shown in FIG. 4, the thick toned parts of the collected veneers 4 present a flaming or flowered pattern as a whole, and zones very similar to the annual ring borders of a natural wood are optimumly separated from each other depending on the ratio in the combination of the collected veneers 4 and material veneers 1.

Further, it is preferable that an inexpensive tropical wood but having comparatively many vessels is used as the material natural wood of the material veneers 1 for forming the collected veneer 4, while another inexpensive tropical wood having comparatively few conduits is used as a material of the other material veneers 1. This is favorable in dyeing in respect that, when a thicker tone is required for the collected veneer 4 and a thinner tone is required for the other material veneer 1, the penetrating degrees of the dye or pigment can be made positively different. It will be also easily understood by one skilled in the art that dyeing degrees of the respective material veneers can be varied from each other in conformity to any desired tone to be presented of the natural wood.

In addition, in the respective parts of the collected veneers 4 representing the annual ring borders of the natural wood in the artificial veneer 8 formed as described above as sliced from the first artificial flitch 2 in the straight grain direction, the joining surfaces or interfaces of the adjacent material veneers 1 necessarily extend over the entire thickness direction. That is, in contrast to the method disclosed in Japanese Patent Publication No. 21521/1975 according to which the simulated pore ranges by means of the grooves made relatively shallow in the material veneer will appear only in a limited part in the width direction of the material veneer and very close to the annual ring borders, the same simulated pore ranges in the product according to the present invention expand over the entire thickness of the respective collected veneers 4, they can be presented in a grain pattern well corresponding to that of a desired natural wood with a remarkable wideness and, therefore, the fidelity of the artificial veneer in simulating the natural wood can be greatly elevated.

Two examples of practically employed conditions in the above embodiment are shown in the following Tables I and II:

TABLE I

1. For Material Veneers:
   (a) Natural wood:
      Tropical wood, labra (having made vessels) of 0.8 mm. thick for the pore range.
      Tropical wood, agatis (having few vessels) of 0.8 mm. thick for parts between the pore ranges.
   (b) Dyeing:
      For 30 minutes in an acid dye (brownish tone) at 90° C.
2. For Forming First Artificial Flitch:
   (a) Pressing dies:
      Flat dies having a concave and convex of ±2 mm. on the pressing surfaces.
   (b) Compressing pressure, time and temperature:
      Under 15 Kg./cm$^2$. for 2 hours at the room temperature.
   (c) Binder:
      Urethane series synthetic resin (Product No. KU661 sold by Japanese corporation Konishi Co., Ltd.)—Containing a dye.
   (d) Total number of veneers: 400
3. For Slicing the First Artificial Flitch:
   0.2 mm. thick.
4. For Forming Second Artificial Flitch:
   (a) Pressing dies:
      Concavo-convex dies having a concave and convex of a curvature of 200 mm. on the pressing surfaces.
   (b) Compressing pressure, time and temperature:
      Under 18 Kg./cm$^2$. for 2 hours at the room temperature.
   (c) Binder:
      Urethane series synthetic resin (Product No. CH7 sold by Konishi Co., Ltd.)—Containing a dye.
   (d) Total number of veneers: 600
      (100 collected veneers and 500 material veneers).
5. For Slicing Second Artificial Flitch:
   0.25 mm. thick. Slicing angle of 1/200 in inclination.
      Dipped in an acid dye at 80° C. for 15 minutes to finish the dyeing.
      The material veneers, collected veneers and artificial veneers were properly dried to make the water content to be 20 to 70% as required.

TABLE II

1. For Material Veneers:
   (a) Natural wood:
      Obeche (having many vessels) 0.8 mm. thick for the pore range.
      Tilia japonica (having few vessels) 0.8 mm. thick for parts between the pore ranges.
   (b) Dyeing:
      For 25 minutes in a metallic complex dye (brownish tone) at 90° C.
2. For Forming First Artificial Flitch:
   (a) Pressing dies: Flat type.
   (b) Compressing pressure, time and temperature:
      Under 15 Kg./cm$^2$. for 2 hours at the room temperature.
   (c) Binder:
      Epoxy series synthetic resin (Product No. E250 sold by Konishi Co., Ltd.).
   (d) Total number of veneers: 600
3. For Slicing First Artificial Flitch:
   0.4 mm. thick.
4. For Forming Second Artificial Flitch:
   (a) Pressing dies:
      Concavo-convex type having a concave and convex of a curvature of 200 mm. on the pressing surfaces.
   (b) Compressing pressure, time and temperature:
      Under 18 Kg./cm$^2$. for 2 hours at the room temperature.
   (c) Binder:
      Urethane series synthetic resin.
   (d) Total number of veneers:
      700 (100 collected veneers and 600 material veneers).
5. For Slicing Second Artificial Flitch:
   0.6 mm. thick. Slicing angle of 1/200 in the inclination.
      Dipped in a metallic complex dye at 80° C. for 20 minutes to finish the dyeing.
      The material veneers, collected veneers and artificial veneers were properly dried to make the water content to be 20 to 70% as required.

According to another feature of the present invention, a method of manufacturing artificial veneers in which the workability for forming the second artificial flitch can be improved and which have a grain pattern of a more improved simulation to the grain pattern of a natural wood but having a less remarkable variation in the color tone. Five embodiments different in the manner of making the second artificial flitch are shown in FIGS. 5 to 10.

Figure 5B:
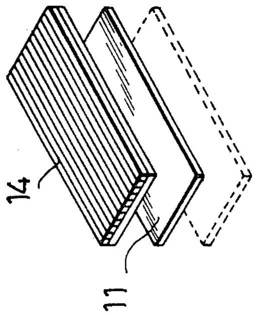
FIG. 5B is a perspective view as disassembled of an essential part of the second flitch made in the method of FIG. 5A.
Figure 5A:
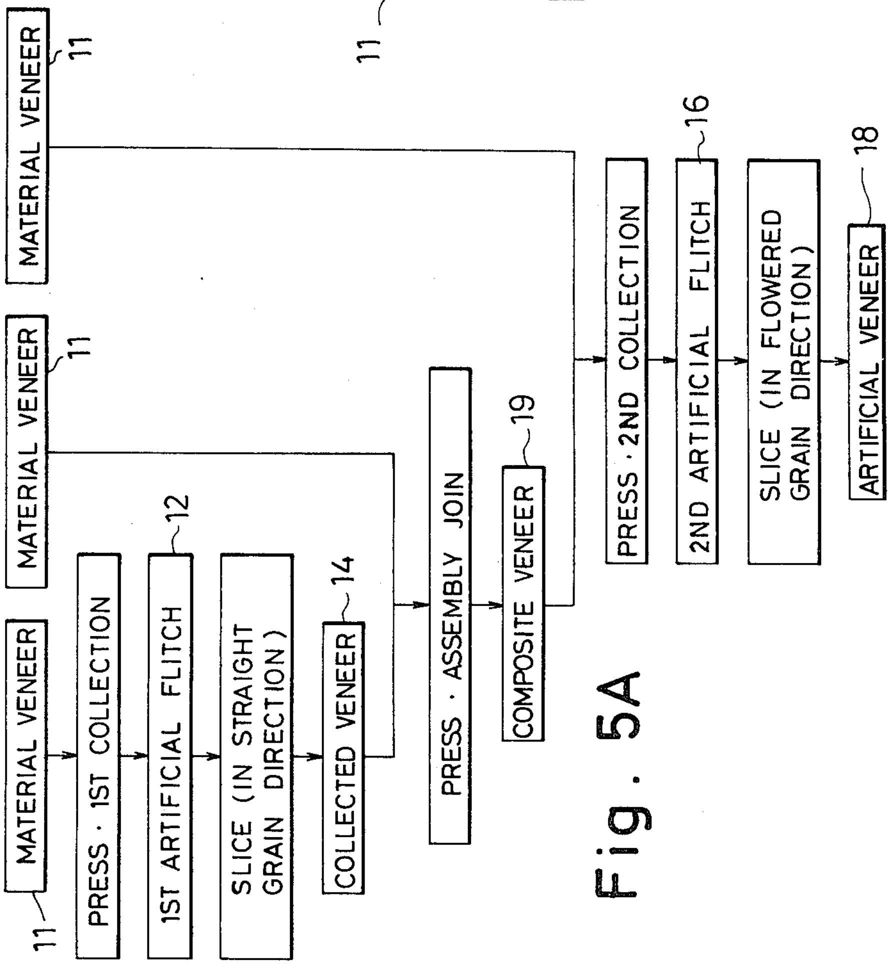
FIG. 5A is a block diagram showing respective steps in another embodiment of the method of manufacturing artificial veneers according to the present invention.

With reference to FIG. 5 showing this embodiment, the steps up to those of making a first artificial flitch 12 and obtaining a collected veneer 14 by laminating, pressing and collecting material veneers 11 are the same as in the foregoing embodiment. On the other hand, in this embodiment, a composite veneer 19 relatively thick in the tone is obtained by assembling the collected veneer 14 and another material veneer 11 and joining them through a binder. Then, as shown in FIG. 5B, this composite veneer 19 and another new material veneer 11 relatively thin in the tone are joined with a binder applied between them, thus joined veneers 19 and 11 are inserted between the same curved pressing dies as the foregoing pressing dies 5 and are pressed and collected to form a second artificial flitch 16. An aritificial veneer 18 can be obtained by slicing this second artificial flitch 16 with a cutter in the flowered grain direction.

In this embodiment, the composite veneer is obtained by joining the material veneer with the collected veneer as described above, whereby such defects that the collected veneer is likely to be broken along the joining surfaces of the respective material veneers for presenting the straight grain patterns, and that the composite veneer is sliced to be so thin as to be difficult to treat can be eliminated, so as to render the composite veneer generally to be easy to handle.

Further, in this embodiment, it will be easily understood by any skilled in the art that the dyeing degrees of the respective veneers can be optimumly varied between them depending on any desired tone of the natural wood to be simulated. In this embodiment, it is preferable that the ratio of the collected veneers to the material veneers at the time of forming the second artificial flitch is made 1:1 to 6.

Practically employed conditions for performing this embodiment shown in FIG. 5 are shown in Table III:

TABLE III

1. For material Veneers:
   (a) Natural wood:
      Labra wood (having many vessels) of 0.8 mm. thick.
      Agatis wood (having few vessels) of 0.8 mm. thick.
      Tilia japonica wood (having few vessels) of 0.8 mm. thick.
   (b) Dyeing:
      For 25 minutes in a metallic complex dye (brownish tone) at 90° C.
2. For Forming First Artificial Flitch:
   (a) Pressing dies: Flat type.
   (b) Compressing pressure, time and temperature:
      Under 15 Kg./cm$^2$. for 2 hours at the room temperature.
   (c) Binder:
      Urethane series synthetic resin.
   (d) Total number of veneers: 400
3. For Slicing First Artificial Flitch:
   0.2 mm. thick.
4. For Forming Composite Veneer:
   (a) Pressing dies: Flat type.
   (b) Compressing pressure, time and temperature:
      Under 10 Kg./cm$^2$. for 1 hour at the room temperature.
5. For Forming Second Artificial Flitch:
   (a) Pressing dies:
      Concavo-convex type having a concave and convex of a curvature of 200 mm. on the pressing surfaces.
   (b) Compressing pressure, time and temperature:
      Under 18 Kg./cm$^2$. for 2 hours at the room temperature.
   (c) Binder: Epoxy series synthetic resin.
   (d) Total number of veneers:
      500 (100 collected veneers and 400 material veneers).
6. For Slicing Second Artificial Flitch:
   0.6 mm. thick. Slicing angle of 1/200 in the inclination.
   Dipped in a metallic complex dye at 80° C. for 15 minutes to finish the dyeing.

The material veneers, collected veneers, composite veneers and artificial veneers were properly dried to make the water content to be 20 to 70% as required.

Figures 6A, 6B, 6C:
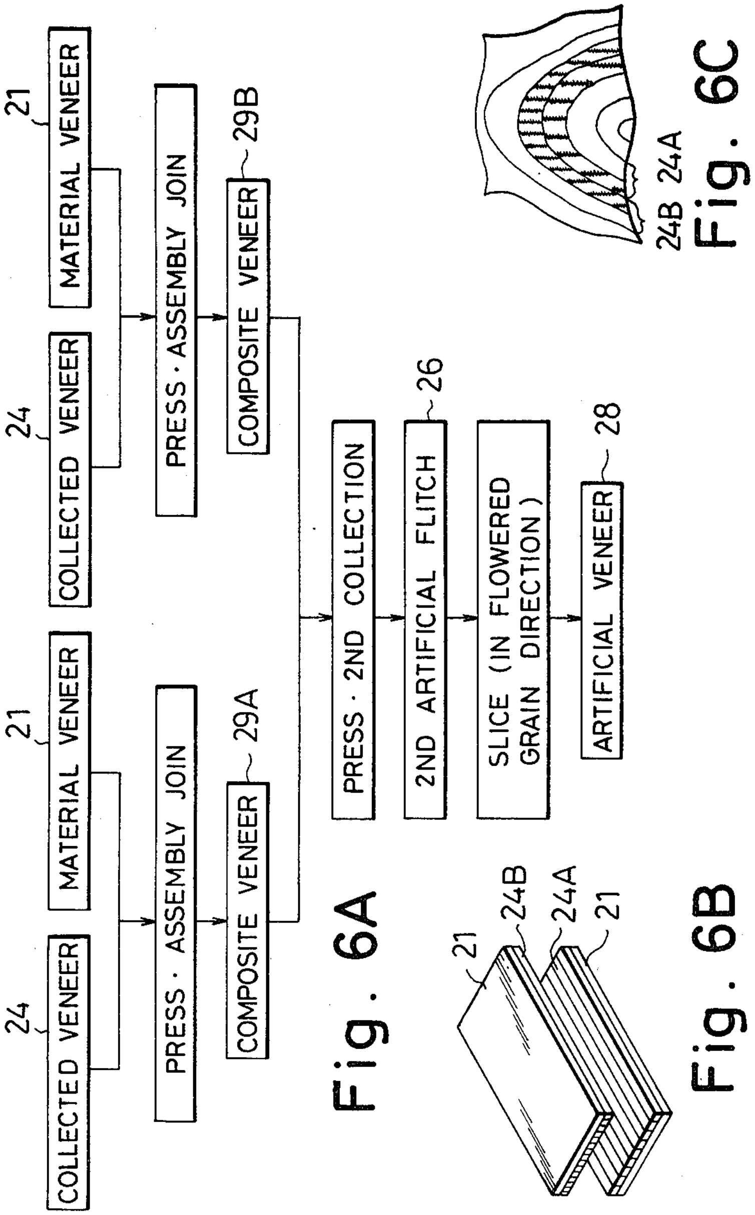
FIG. 6A is a block diagram showing respective steps in a further embodiment of the method of manufacturing artificial veneers according to the present invention.
FIG. 6B is a perspective view as disassembled of an essential part of the second flitch made in the method of FIG. 6A.
FIG. 6C is a fragmental view as magnified for schematically showing a part of the surface of the artificial veneer obtained finally by the method of FIG. 6A.

In the embodiment of FIG. 6A, two different kinds of composite veneers are used. The steps until a collected veneer 24 is obtained and the steps until a composite veneer 29 is obtained by combining and joining the collected veneers 24 and material veneers 21 are the same as in the embodiment of FIG. 5. On the other hand, in the present embodiment, a composite veneer 21A of the collected veneer of a relatively thick tone and material veneer and another composite veneer 24B of the collected veneer of a relatively thin tone and material veneer are paired by placing the both collected veneers to be adjacent to each other as shown in FIG. 6B. Many pairs of such two different composite veneers are alternately arranged, painted with a binder, laminated in any desired number, pressed with the same pressing dies as the pressing dies 5 in FIG. 2 and collected to form a second artificial flitch 26. Accordingly, it is possible to provide an artificial veneer 28 in which the collected veneer is easy to handle the same as in the embodiment in FIG. 5 and, on the other hand, more various representations than in the artificial veneer in the case of FIG. 5 can be achieved, by slicing this second artificial flitch in the flowered grain direction.

In this case, the two different composite veneers are laminated so that, as shown in FIG. 6C, the collected veneer of a thick tone will be positioned in the zone inside the zone indicating the annular ring border and the collected veneer of a thin tone will be positioned in the outside zone. The ratio of combining the two different composite veneers with each other is made 1:1.

Further, it will be easily understood by any skilled in the art that, in the embodiment of FIG. 6, an artificial veneer can be formed by properly assembling three or more composite veneers different in the natural wood forming the material veneer and the dyeing degree.

Practically established conditions for performing the embodiment of FIG. 6 are shown in Table IV:

TABLE IV

1. For Material Veneers:
   (a) Natural wood:
      Obeche wood (having many vessels) of 0.8 mm. thick.
      Tilia japonica wood (having few vessels) of 0.8 mm. thick.
   (b) Dyeing:
      For 25 minutes in an acid dye (brownish tone) at 90° C.
2. For Forming First Artificial Flitch:
   (a) Pressing dies: Flat type.
   (b) Compressing pressure, time and temperature:
      Under 15 Kg./cm$^2$. for 2 hours at the room temperature.
   (c) Binder: Epoxy series synthetic resin.
   (d) Total number of veneers: 600
3. For Slicing the First Artificial Flitch:
   0.2 mm. thick.
4. For Forming Composite Veneer:
   (a) Pressing dies: Flat type.
   (b) Compressing pressure, time and temperature:
      Under 10 Kg./cm$^2$. for 1 hour at the room temperature.
5. For Forming Second Artificial Flitch:
   (a) Pressing dies:

Concavo-convex type having a concave and convex of a curvature of 200 mm. on the pressing surfaces.
(b) Compressing pressure, time and temperature:
Under 18 Kg./cm$^2$. for 2 hours at the room temperature.
(c) Binder: Urethane series synthetic resin.
(d) Total number of veneers: 700
6. For Slicing Second Artificial Flitch:
0.6 mm. thick. Slicing angle of 1/200 in the inclination.
Dipped in an acid dye at 80° C. for 15 minutes to finish the dyeing.
The material veneers, collected veneers, composite veneers and artificial veneers were properly dried to make the water content to be 20 to 70% as required.

Figures 7A, 7B, 7C:
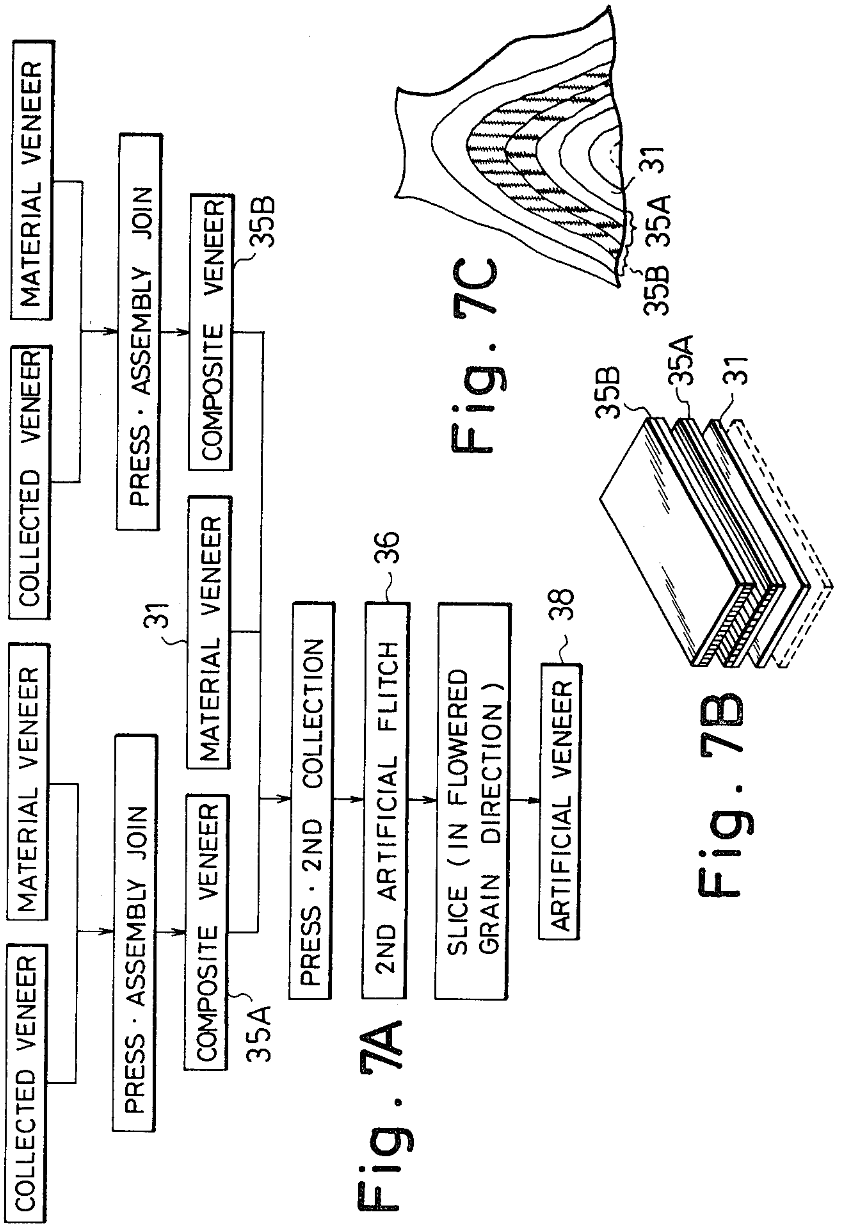
FIG. 7A is a block diagram showing respective steps in still another embodiment of the method according to the present invention.
FIG. 7B is a perspective view as disassembled of an essential part of the second flitch made according to the method of FIG. 7A.
FIG. 7C is fragmentary view as magnified for schematically showing a part of the surface of the artificial veneer obtained finally by the slicing in the flowered grain direction according to the method of FIG. 7A.

Referring to another embodiment shown in FIG. 7A, in contrast to the foregoing embodiment of FIG. 6, other material veneers are further added to the two different composite veneers. The steps until the collected veneer is obtained and the step of obtaining the two different composite veneers by joining the respective material veneers with the collected veneers different relatively in the tone are the same as in the foregoing embodiment of FIG. 6. Further, also in the present embodiment, the collected veneers are assembled so that the collected veneer of a relatively thick tone will be positioned inside the zone for representing the annular ring border and the collected veneer of a relatively thin tone will be positioned outside the zone for representing the annular ring border. As shown in FIG. 7B, two different composite veneers 35A and 35B and another new material veneer 31 are assembled and joined with a binder applied between the respective veneers and many of them are heaped up and collected with the same concavo-convex (curved) dies as the pressing dies 5 shown in FIG. 2 to form a second artificial flitch 36. By slicing this artificial flitch 36 with a cutter in the flowered grain direction, there can be provided an artifical veneer 38 provided with a predetermined strength at the collected veneers, the same as in the foregoing embodiments of FIGS. 5 and 6, which is easy to handle and allows to achieve a larger number of variety in the grain pattern than in the artificial veneers according to the respective embodiments of FIGS. 1 to 4, 5 and 6.

It will be understood that, in the embodiment of FIG. 7, the kind of wood for the material veneer and the dyeing degree can be varied as required. Further, it is preferable that the ratio of assembling the two different composite veneers and the material veneers is 1:1:1 to 6.

Respective conditions employed for practicing this embodiment of FIG. 7 are shown in the following Table V:

TABLE V

1. For Material Veneers:
(a) Natural wood:
Labra wood (having many vessels) of 0.8 mm. thick.
Agatis wood (having few vessels) of 0.8 mm. thick.
(b) Dyeing:
For 25 minutes in an acid dye (brownish tone) at 90° C.
2. For Forming First Artificial Flitch:
(a) Pressing dies: Flat type.
(b) Compressing pressure, time and temperature:
Under 15 Kg./cm$^2$. for 2 hours at the room temperature.
(c) Binder: Epoxy series synthetic resin.
(d) Total number of veneers: 400
3. For Slicing First Artificial Flitch:
0.2 mm. thick.
4. For Forming Composite Veneer:
(a) Pressing dies: Flat type.
(b) Compressing pressure, time and temperature:
Under 10 Kg./cm$^2$. for 1 hour at the room temperature.
5. For Forming Second Artificial Flitch:
(a) Pressing dies:
Concavo-convex type having a concave and convex of a curvature of 200 mm. on the pressing surfaces.
(b) Compressing pressure, time and temperature:
Under 18 Kg./cm$^2$. for 2 hours at the room temperature.
(c) Binder: Urethane series synthetic resin.
(d) Total number of veneers: 500
6. For Slicing Second Artificial Flitch:
0.6 thick. Slicing angle of 1/200 in the inclination.
Dipped in an acid dye at 80° C. for 20 minutes to finish the dyeing.
The material veneers, collected veneers, composite veneers and artificial veneers were properly dried to make the water content to be 20 to 70% as required.

Figure 8B:
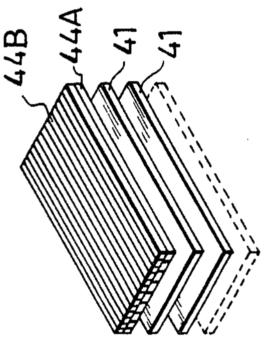
FIG 8B is a perspective view as disassembled of an essential part of the second flitch made in the method of FIG. 8A.
Figure 8A:
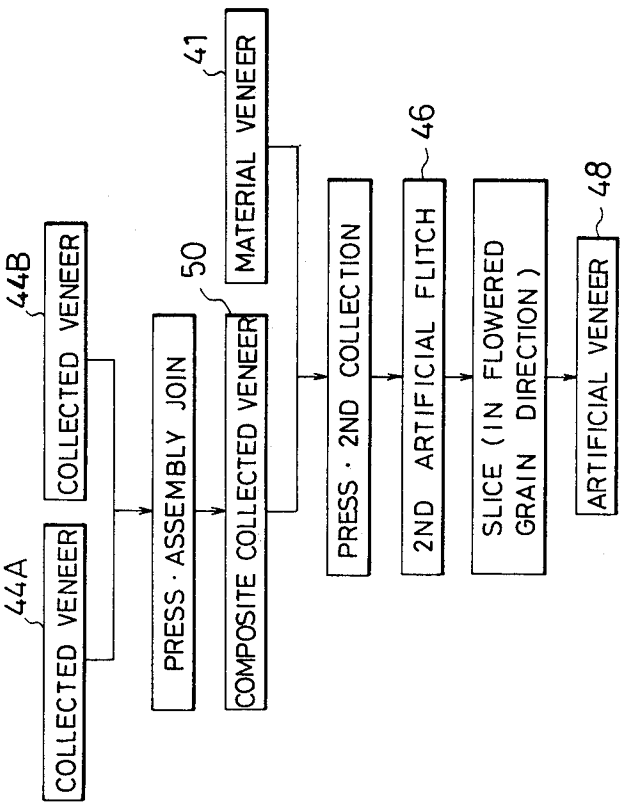
FIG. 8A is a block diagram showing respective steps of yet another embodiment of the method according to the present invention.

Referring next to still another embodiment of FIG. 8A, two collected veneers 44A and 44B different in the tone are joined with a binder to form a composite collected veneer 50. As shown in FIG. 8B, the composite collected veneer 50 as combined with other material veneers 41 is arranged so that the collected veneer of a relatively thick tone will be positioned inside the zone simulating the annual ring border and the other collected veneer of a relatively thin tone will be positioned outside the above zone and a required number of thus combined sets are joined with a binder into a pile, which is pressed to be collected with the same pressing dies as the pressing dies 5 in FIG. 2 to form a second artificial flitch 46.

By slicing this second artificial flitch 46 with a cutter in the flowered grain direction, an artificial veneer 48 which can take another representation of a grain pattern than those in the respective foregoing embodiments is provided.

It is preferable that the ratio of combining the two collected veneers and material veneers is made 1:1:1 to 6.

Practically employed conditions for performing the embodiment of FIG. 8 are shown in the following Table VI:

TABLE VI

1. For Material Veneers:
(a) Natural wood:
Obeche wood (having many vessels) of 0.8 mm. thick.
Tilia japonica wood (having few vessels) of 0.8 mm. thick.
(b) Dyeing:
For 25 minutes in a metallic complex dye (brownish tone) at 90° C.
2. For Forming First Artificial Flitch:
(a) Pressing dies: Flat type.
(b) Compressing pressure, time and temperature:

Under 15 Kg./cm². for 2 hours at the room temperature.

(c) Binder: Urethane series synthetic resin.

(d) Total number of veneers: 600

3. For Slicing First Artificial Flitch:

0.2 mm. thick.

4. For Forming Composite Collected Veneer:

(a) Pressing dies: Flat type.

(b) Compressing pressure, time and temperature:

Under 10 Kg./cm². for 1 hour at the room temperature.

5. For Forming Second Artificial Flitch:

(a) Pressing dies:

Concavo-convex type having a concave and convex of a curvature of 200 mm. on the pressing surfaces.

(b) Compressing pressure, time and temperature:

Under 18 Kg./cm². for 2 hours at the room temperature.

(c) Binder: Epoxy series synthetic resin.

(d) Total number of veneers: 700

6. For Slicing Second Artificial Flitch:

0.6 mm. thick. Slicing angle of 1/200 in the inclination.

Dipped in a metallic complex dye at 80° C. for 15 minutes.

The material veneers, collected veneers, composite collected veneers and artificial veneers were properly dried to make the water content to be 20 to 70% as required.

Figure 9B:
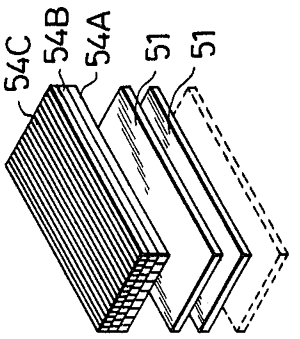
FIG. 9B is a perspective view as disassembled of an essential part of the second flitch made in the method of FIG. 9A.
Figure 9A:
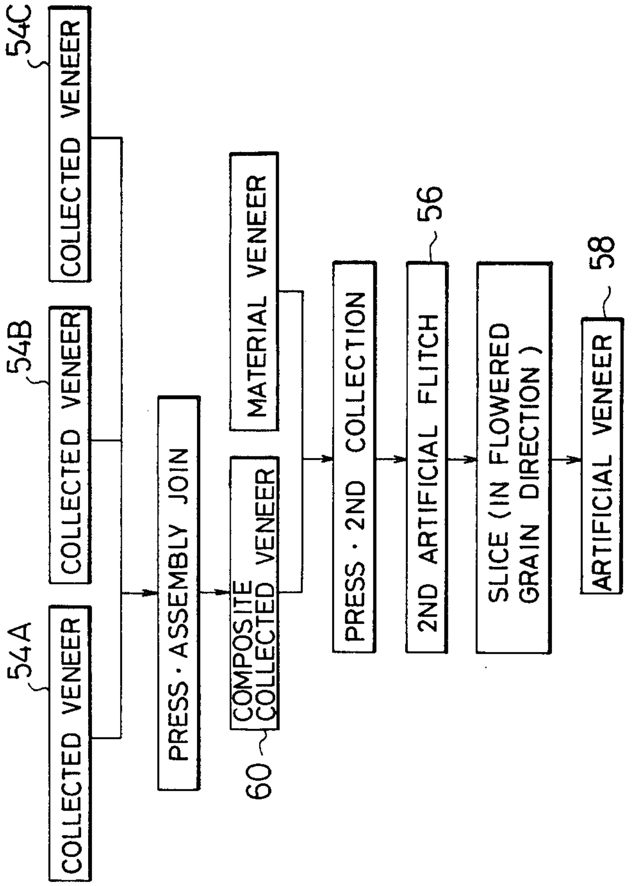
FIG. 9A is a block diagram showing respective steps of still another embodiment of the method according to the present invention.

In still another embodiment of FIG. 9A, as compared with the two different collected veneers in the embodiment of FIG. 8, further one kind of collected veneer, that is, three kinds of collected veneers 54A, 54B and 54C different from one another in the tone are joined through a binder so as to gradually thin from one side to the other to form a composite collected veneer 60. As shown in FIG. 9B, they are assembled in a combination with other material veneers 51 so that the thick toned collected veneer will be positioned inside the zone representing the annual ring border and the thin toned collected veneer will be positioned outside such zone and a desired number of sets of thus assembled veneers are joined with a binder into a pile.

This pile of the veneers is pressed and collected with the same pressing dies as the pressing dies of FIG. 2 to form a second flitch 56. By slicing this second flitch 56 in the flowered grain direction, an artificial veneer 58 increased in the grain pattern simulating fidelity to be higher than in the embodiment of FIG. 8 can be provided. In this case, the ratio of assembling the three kinds of collected veneers and material veneers is 1:1:1 to 6.

Respective conditions practically employed for the embodiment of FIG. 9 are shown in the following Table VII:

TABLE VII

1. For Material Veneers:

(a) Natural wood:

Labra wood (having many vessels) of 0.8 mm. thick.

Obeche wood (having many vessels) of 0.8 mm. thick.

Agatis wood (having few vessels) of 0.8 mm. thick.

(b) Dyeing:

For 25 minutes in a metallic complex dye (brownish tone) at 90° C.

2. For Forming First Artificial Flitch:

(a) Pressing die: Flat type.

(b) Compressing pressure, time and temperature:

Under 15 Kg./cm². for 2 hours at the room temperature.

(c) Binder: Urethane series synthetic resin.

(d) Total number of veneers: 600

3. For Slicing First Artificial Flitch:

0.2 mm. thick.

4. For Forming Composite Collected Veneer:

(a) Pressing dies: Flat type.

(b) Compressing pressure, time and temperature:

Under 10 Kg./cm². for 1 hour at the room temperature.

5. For Forming Second Artificial Flitch:

(a) Pressing dyes:

Concavo-convex type having a concave and convex of a curvature of 200 mm. on the pressing surfaces.

(b) Compressing pressure, time and temperature:

Under 18 Kg./cm². for 2 hours at the room temperature.

(c) Binder: Epoxy series synthetic resin.

(d) Total number of veneers: 700

6. For Slicing Second Artificial Flitch:

0.6 mm. thick. Slicing angle of 1/200 in the inclination.

Dipped in a metallic complex dye at 80° C. for 15 minutes to finish the dyeing.

The material veneers, collected veneers, composite collected veneers and artificial veneers were properly dried to make the water content to be 20 to 70% as required.

Figures 10A, 10B:
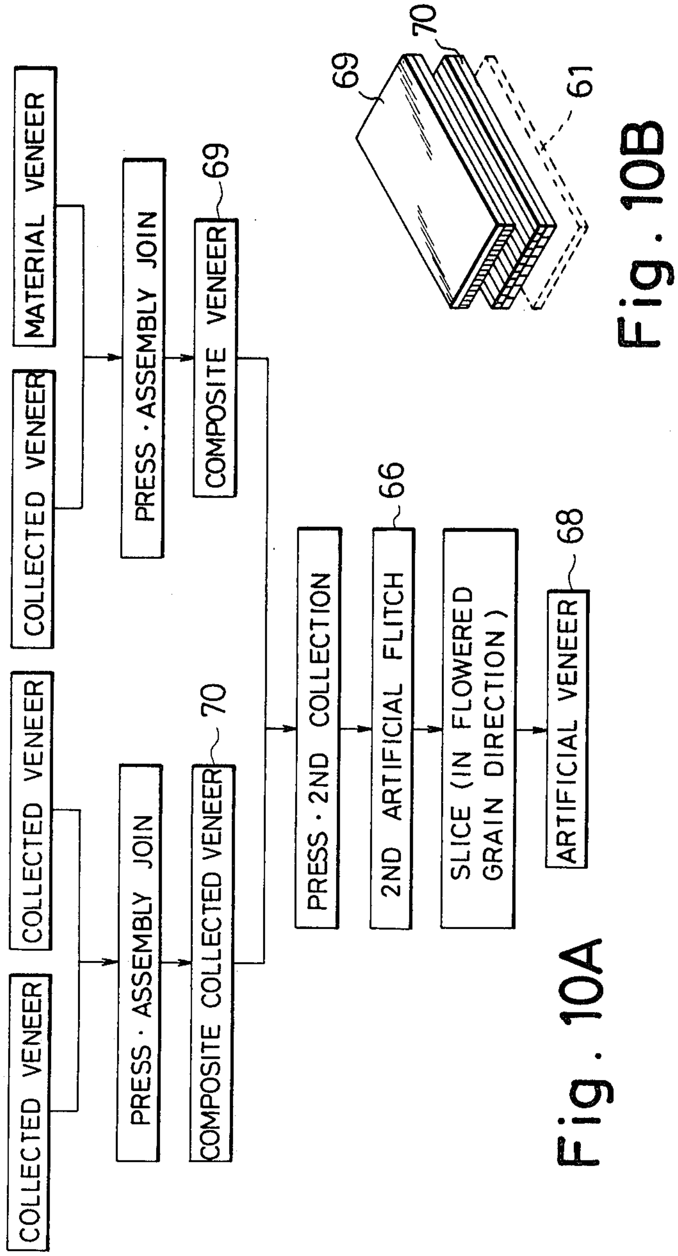
FIG. 10A is a block diagram showing respective steps of still further embodiment of the method according to the present invention.
FIG. 10B is a perspective view as disassembled of an essential part of the second flitch made in the method of FIG. 10A.

In a still further embodiment as shown in FIG. 10A, such composite veneer 69 as is shown in, for example, the embodiment of FIG. 5 and a composite collected veneer 70 made by joining such two different kinds of the collected veneers as shown in FIG. 8 with each other are assembled so that, as seen in FIG. 10B, the collected veneer of the composite veneer is arranged adjacent the composite collected veneer. Then a desired number of thus assembled sets are heaped up into a pile with a binder applied between the respective veneers, and the pile is pressed and collected to make a second artificial flitch 66. By slicing this second artificial flitch in the flowered grain direction, an artificial veneer 68 higher in the grain pattern simulating fidelity can be obtained. Further, it should be understood that, in this case, too, the thick and thin tones are properly arranged substantially in the same manner as in FIG. 9A. In this embodiment, as shown by the dotted lines in FIG. 10B, further another material veneer 61 can be also assembled.

Respective conditions for practicing this embodiment of FIG. 10 are as in the following Table VIII:

TABLE VIII

1. For Material Veneers:

(a) Natural wood:

Labra wood (having many vessels) of 0.8 mm. thick.

Obeche wood (having many vessels) of 0.8 mm. thick.

Agatis wood (having few vessels) of 0.8 mm. thick.

Tilia japonica wood (having few vessels) of 0.8 mm. thick.

(b) Dyeing:

For 25 minutes in an acid dye (brownish tone) at 90° C.

2. For Forming First Artificial Flitch:
   (a) Pressing dies: Flat type.
   (b) Compressing pressure, time and temperature: Under 15 Kg./cm$^2$. for 2 hours at the room temperature.
   (c) Binder: Urethane series synthetic resin.
   (d) Total number of veneers: 600
3. For slicing First Artificial Flitch: 0.2 mm. thick.
4. For Forming Composite Veneer and Composite Collected Veneer:
   (a) Pressing dies: Flat type.
   (b) Compressing pressure, time and temperature: Under 10 Kg./cm$^2$. for 1 hour at the room temperature.
5. For Forming Second Artificial Flitch:
   (a) Pressing dies: Concavo-convex type having a concave and convex of a curvature of 200 mm. on the pressing surfaces.
   (b) Compressing pressure, time and temperature: Under 18 Kg./cm$^2$. for 2 hours at the room temperature.
   (c) Binder: Epoxy series synthetic resin.
   (d) Total number of veneers: 700
6. For Slicing Second Artificial Flitch: 0.6 mm. thick. Slicing angle of 1/200 in the inclination.
   Dipped in an acid dye at 80° C. for 15 minutes to finish the dyeing.
   The material veneers, collected veneers, composite veneers, composite collected veneers and artificial veneers were properly dried to make the water content to be 20 to 70% as required.

It should be noted that, in the present invention, various modifications are possible within the scope of appended claims. For example, in any of the above described embodiments, the material veneers can be bleached and dyed after the first artificial flitch is formed, instead of the dying performed as a pretreatment. Further, the binder can be replaced with such adhesive as, for example, a thermoplastic adhesive film placed between the respective veneers.

According to the method of manufacturing artificial veneers of the present invention, as has been disclosed, particularly, an artificial veneer faithfully simulating the grain pattern of natural woods can be provided, and an artificial veneer having a pattern very similar to the grain pattern of a high grade wood can be continuously mass-produced from inexpensive tropical woods. Such remarkable effects that, for example, the method which well enables it possible to prevent the manufactured veneers from cracking by reinforcing the collected veneers so as to render them easy to handle, can be well expected to be provided.

What is claimed as our invention is:

1. A method of manufacturing artificial veneers comprising the steps of preparing material veneers cut out of a natural wood, forming a first artificial flitch by collecting under a pressure a plurality of said material veneers heaped up with a binder interposed between them, making collected veneers by slicing said first artificial flitch in a straight grain direction by a cutting edge oriented transversely of the planes of said material veneers, forming a second artificial flitch by combining another kind of material veneer with said collected veneers and by collecting under a pressure said combined veneers heaped up with binder applied between them, and slicing said second artificial flitch in a flowered grain direction.

2. A method according to claim 1 wherein said collected veneer is made thicker in the tone than said another kind of veneer, and a plurality of the other veneers are combined.

3. A method according to claim 1 wherein said binder is an adhesive which is applied to respective said veneers.

4. A method according to claim 1 wherein said binder is an adhesive film of a synthetic resin.

5. A method according to claim 1 wherein the ratio of combining said collected veneers and material veneers in the step of forming said second artificial flitch is made 1:1 to 6.

6. A method of manufacturing artificial veneers comprising the steps of preparing a material veneer cut out of a natural wood, forming a first artificial flitch by collecting under a pressure a plurality of said material veneers heaped up with a binder interposed between them, making a collected veneer by slicing said first artificial flitch in a straight grain direction by a cutting edge oriented transversely of the planes of said material veneers, forming a composite veneer by assembling the material veneer with said collected veneer and by joining them under a pressure with said binder interposed between them, forming a second artificial flitch by combining a plurality of the other material veneers with said composite veneer and by collecting under a pressure a plurality of said assembled veneers heaped up with said binder interposed between them, and slicing said second artificial flitch in a flowered grain direction.

7. A method according to claim 6 wherein said binder is an adhesive which is applied to respective said veneers.

8. A method according to claim 6 wherein said binder is an adhesive film of a synthetic resin.

9. A method according to claim 6 wherein the ratio of assembling said collected veneers and material veneers in the step of forming said second artificial flitch is made 1:1 to 6.

10. A method of manufacturing artificial veneers comprising the steps of preparing a plurality of different kinds of material veneers cut out of different natural woods, forming two different kinds of first artificial flitches by collecting under a pressure a plurality of respective said different material veneers heaped up with a binder interposed between them, making two different kinds of collected veneers by slicing said two different first artificial flitches in a straight grain direction by a cutting edge oriented transversely of the planes of said material veneers, forming two different kinds of composite veneers by assembling the material veneers with said two different kinds of collected veneers and by joining them under a pressure with said binder interposed between them, forming a second artificial flitch by joining under a pressure a plurality of said two different kinds of composite veneers heaped up with the collected veneers arranged alternately adjacent each other with said binder interposed between them, and slicing said second artificial flitch in a flowered grain direction.

11. A method according to claim 10 wherein said collected veneer assembled in one of said two different composite veneers is made relatively thicker in the tone than the collected veneer in the other composite veneer.

12. A method according to claim 10 wherein said binder is an adhesive which is applied to respective said veneers.

13. A method according to claim 10 wherein said binder is an adhesive film of a synthetic resin.

14. A method according to claim 10 wherein the ratio of assembling said two different kinds of composite veneers in the step of forming said second artificial flitch is made 1:1.

15. A method of manufacturing artificial veneers comprising the steps of preparing at least two different kinds of material veneers cut out of different natural woods, forming two different kinds of first artificial flitches by collecting under a pressure a plurality of respective said different material veneers heaped up with a binder interposed between them, making two different kinds of collected veneers by slicing respective said first artificial flitches in a straight grain direction by a cutting edge oriented transversely of the planes of said material veneers, forming two different kinds of composite veneers by assembling the material veneers with respective said two different kinds of collected veneers and by joining them under a pressure and with said binder interposed between them, forming a second artificial flitch by collecting under a pressure a plurality of respective said two different kinds of composite veneers heaped up with the collected veneers arranged adjacent each other and as assembled with at least one of the material veneers with said binder interposed between them, and slicing said second artificial flitch in a flowered grain direction.

16. A method according to claim 15 wherein said collected veneer assembled in one of said composite veneer is made relatively thicker in the tone than the collected veneer in the other composite veneer, and said two different kinds of collected veneers are made relatively thicker in the tone than the other material veneers.

17. A method according to claim 15 wherein said binder is an adhesive which is applied to respective said veneers.

18. A method according to claim 15 wherein said binder is an adhesive film of a synthetic resin.

19. A method according to claim 15 wherein the ratio of assembling said collected veneers and material veneers in the step of forming said second artificial flitch is made 1:1 to 6.

20. A method of manufacturing artificial veneers comprising the steps of preparing at least two different kinds of material veneers cut out of different woods, forming two different kinds of first artificial flitches by collecting under a pressure a plurality of said material veneers heaped up with a binder interposed between them, making two different kinds of collected veneers by slicing respective said first artificial flitches in a straight grain direction by a cutting edge oriented transversely of the planes of said material veneers, forming a composite collected veneer by joining under a pressure a combination of respective said two different kinds of collected veneers with said binder interposed between them, forming a second artificial flitch by assembling the composite collected veneer and at least one of the material veneers and by collecting under a pressure a plurality of said assembled veneers with said binder interposed between them, and slicing said second artificial flitch in a flowered grain direction.

21. A method according to claim 20 wherein one of said different kinds of collected veneers for said composite collected veneer is made relatively thicker in the tone than the other.

22. A method according to claim 20 wherein said binder is an adhesive which is applied to respective said veneers.

23. A method according to claim 20 wherein said binder is an adhesive film of a synthetic resin.

24. A method according to claim 20 wherein the ratio of assembling said collected veneers and material veneers in the step of forming said second artificial flitch is made 1:1 to 6.

25. A method of manufacturing artificial veneers comprising the steps of preparing at least two different kinds of material veneers cut out of different natural wood, forming three different kinds of first artificial flitches by collecting under a pressure a plurality of respective said different material veneers heaped up with a binder interposed between them, making three different kinds of collected veneers by slicing respective said three different kinds of first artificial flitches in a straight grain direction by a cutting edge oriented transversely of the planes of said material veneers, forming a composite collected veneer by combining and joining together under a pressure respective said three different kinds of collected veneers with said binder interposed between them, forming a second artificial flitch by assembling said composite collected veneers and at least one of the material veneers and by collecting under a pressure a plurality sets of said assembled veneers heaped up with said binder interposed between them, and slicing said second artificial flitch in a flowered grain direction.

26. A method according to claim 25 wherein said three different kinds of collected veneers of said composite collected veneer are sequentially varied in the tone.

27. A method according to claim 25 wherein said binder is an adhesive which is painted to respective said veneers.

28. A method according to claim 25 wherein said binder is an adhesive film of a synthetic resin.

29. A method according to claim 25 wherein the ratio of said assembling of said collected veneers and material veneers in the step of forming said second artificial flitch is made 1:1 to 6.

30. A method of manufacturing artificial veneers comprising the steps of preparing at least two different kinds of material veneers cut out of different natural woods, forming at least three different kinds of first artificial flitches by collecting under a pressure a plurality of said material veneers heaped up with a binder interposed between them, forming at least three different kinds of collected veneers by slicing respective said first artificial flitches in a straight grain direction by a cutting edge oriented transversely of the planes of said material veneers, forming a composite veneer by combining and joining one of said different kinds of collected veneers and material veneer with said binder interposed between them, forming a second artificial flitch by assembling into a set with composite veneer with said composite collected veneer with the collected veneer in the composite veneer arranged adjacent the composite collected veneers and by collecting under a pressure a plurality of said assembled sets alternately heaped up with said binder interposed between them, and slicing said second artificial flitch in a flowered grain direction.

31. A method according to claim 30 wherein said step of forming said second artificial flitch includes a step of further assembling said material veneer with said assembled set.

32. A method according to claim 30 wherein respective said collected veneers disposed adjacent each other in said assembled set of said composite veneer and composite collected veneer are varied sequentially in the tone.

33. A method according to claim 30 wherein said binder is an adhesive which is applied to respective said veneers.

34. A method according to claim 30 wherein said binder is an adhesive film of a synthetic resin.

35. A method according to claim 31 wherein the ratio of assembling said collected veneer and material veneer in the step of forming said second artificial flitch is made 1:1 to 6.

* * * * *